Patented Dec. 7, 1937

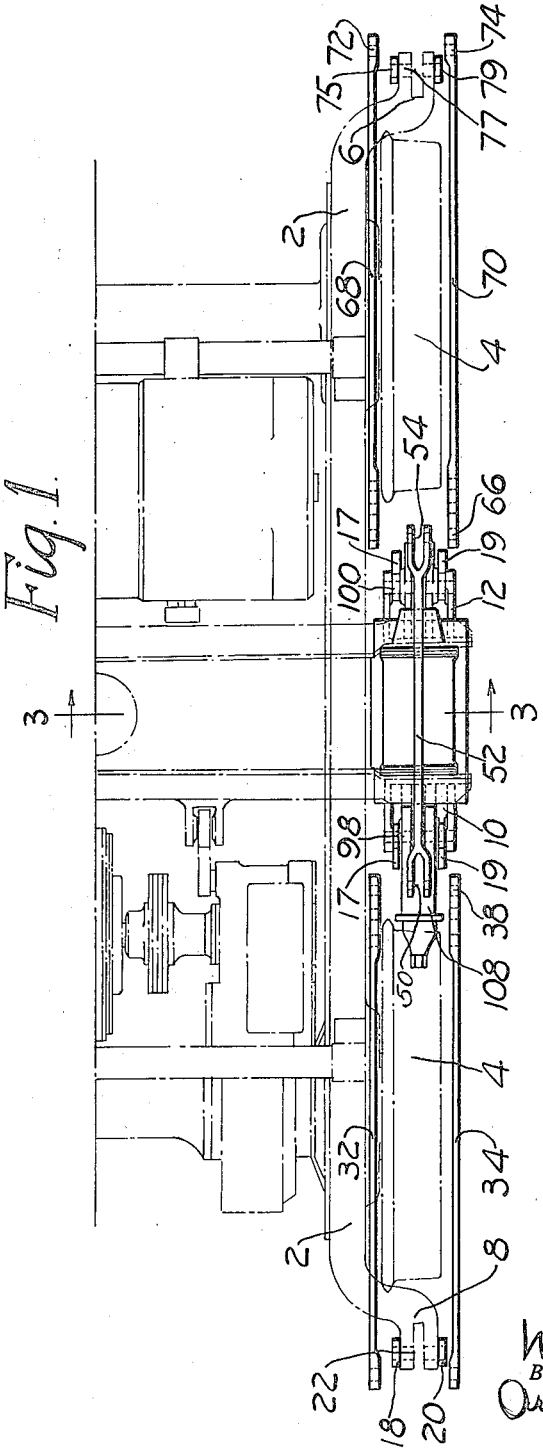

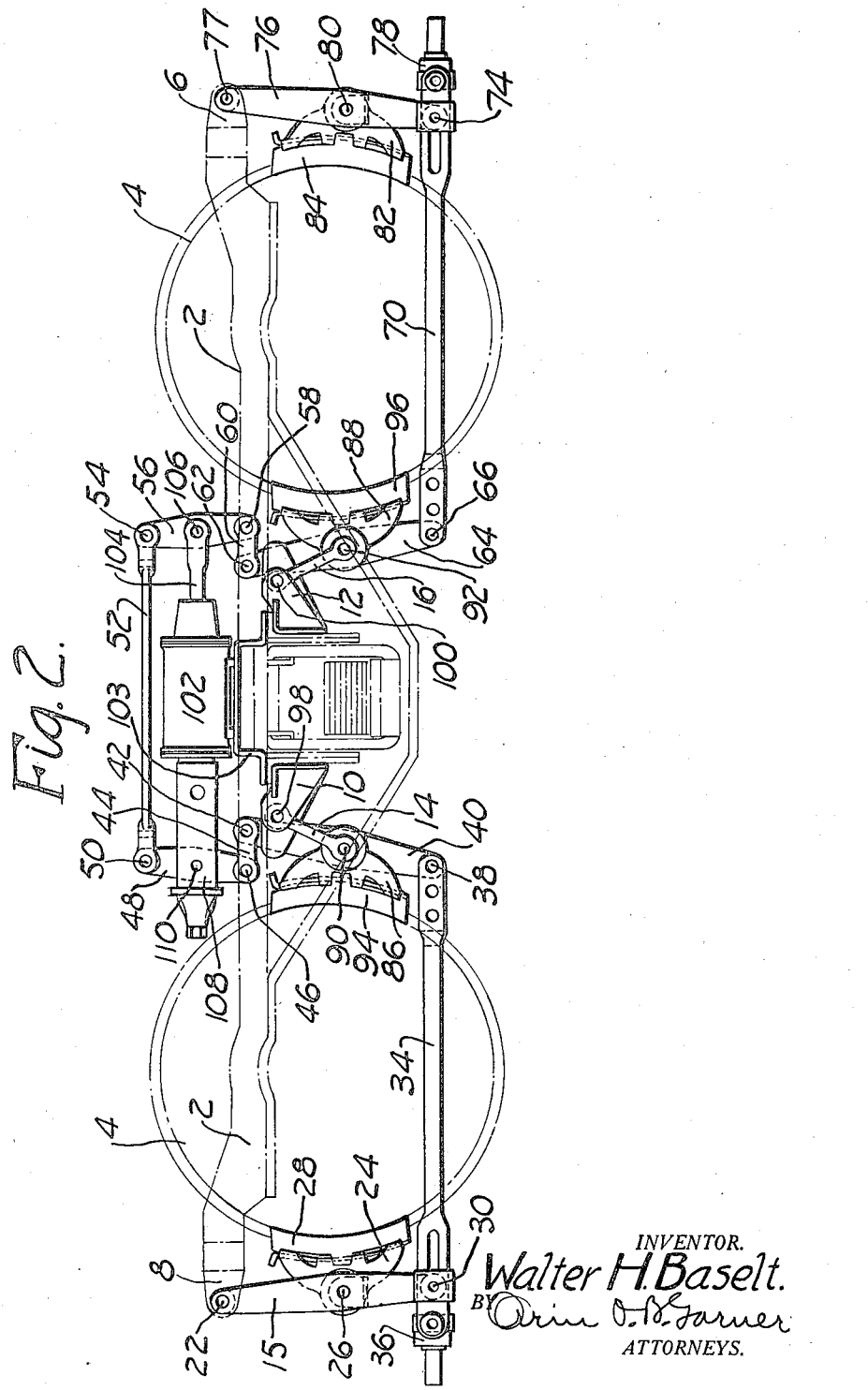

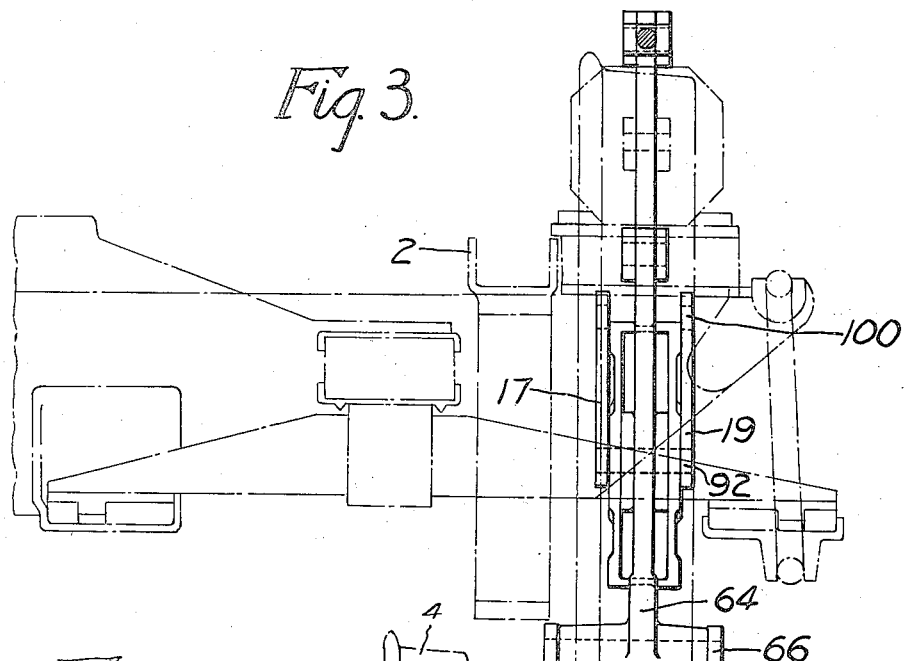
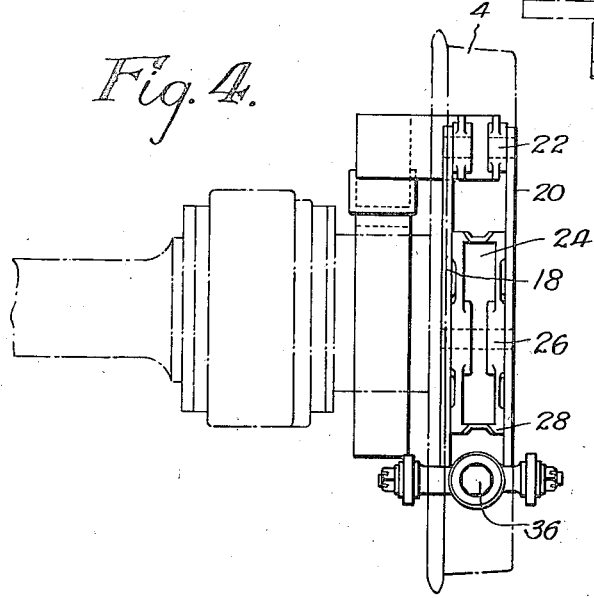

2,101,488

UNITED STATES PATENT OFFICE 2,101,488

CLASP BRAKE

Walter H. Baselt, Chicago, Ill., assignor to American Steel Foundries, Chicago, Ill., a corporation of New Jersey Application December 28, 1935, Serial No. 56,513

26 Claims. (Cl. 188—56)

My invention relates to brake equipment and more particularly to brakes of the clasp type wherein brake heads and shoes are applied at both sides of the wheels.

An object of my invention is to design clasp brake equipment for railway trucks wherein all the parts will be accessible and convenient for inspection or repair.

Another object of my invention is to provide such a brake system in as compact form as possible and likewise in a simple construction having few wearing parts and, therefore, relatively long lived.

Still another object of my invention is to provide such clasp brake equipment in combination with a novel arrangement of operating means shown herein as a brake cylinder.

A still further object is to provide clasp brake rigging in a novel form having slack adjustment means, both automatic and manual, for taking up the wear that occurs in the wheels and the brake shoes.

A still further object of my invention is to provide a novel form of brake rigging having the above mentioned features particularly desirable in a motor truck wherein the clearance conditions are very difficult to satisfy and where space must be conserved.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is a fragmentary top plan view of a truck construction embodying my invention. Inasmuch as the structures are similar for both sides of the truck only one-half of the truck is shown since it is believed that such a showing will be conducive to simplicity and better understanding of the invention;

Figure 2 is a side elevation of the truck construction shown in Figure 1;

Figure 3 is a section taken approximately in the transverse vertical center plane of the truck construction shown in Figure 1 and as indicated on the line 3—3 of Figure 1, certain parts as, for example, the spring and the cylinder, being shown in elevation instead of in section for simplification; and Figure 4 is an end elevation of the truck construction shown in Figure 1, the view being taken at the left end of the structure as shown in Figure 1.

Describing the structure of my invention in more detail, the brake rigging is shown as applied to the truck frame 2 having associated with it the wheel and axle assemblies 4. At the respective ends of the truck frame the brackets 6 and 8, formed thereon, provide support means for the dead levers outwardly of the wheels. Between the wheels the brackets 10 and 12 provide support means for the brake equipment through the medium of hangers 14 and 16. These hangers are formed as a pair of identical inner and outer halves designated respectively 17 and 19.

As viewed at the left of Figure 2 the dead truck lever 15, formed as a pair of identical inner and outer portions 18 and 20 respectively (Figure 4), is pivotally supported at its upper end as at 22 from the bracket 8 on the truck frame 2. The brake head 24 is pivotally supported by the two halves of the dead lever 15 at a point intermediate its length as at 26 and the associated brake shoe 28 is mounted for operative engagement with the periphery of the adjacent wheel. The lower end of the dead lever 15 is pivotally connected as at 30 to the inner and outer straps 32 and 34 respectively and this connection is made adjustable by means of the manual slack adjuster 36. The opposite ends of the straps 32 and 34 respectively are pivotally and adjustably connected as at 38 to the lower end of the live truck lever 40. The upper end of the live lever 40 is pivotally connected as at 42 to the link 44 and the opposite end of the link is pivotally connected as at 46 to the lower end of the dead cylinder lever 48, the upper end of the dead cylinder lever being pivotally connected as at 50 to one end of the pull rod 52. The opposite end of the pull rod 52 is pivotally connected as at 54 to the upper end of the live cylinder lever 56, the lower end of the live cylinder lever 56 being pivotally connected as at 58 to the link 60, the opposite end of the link 60 being pivotally connected as at 62 to the upper end of the live truck lever 64, whose lower end is adjustably and pivotally connected as at 66 to the inner and outer straps 68 and 70. The opposite ends of the straps 68 and 70 are pivotally connected as at 72 and 74 to the lower end of the dead truck lever 76 consisting of inner and outer halves 78 and 79 respectively similar to the dead lever 16 at the opposite end of the truck. The upper end of the dead lever 76 is pivotally supported as at 77 from the bracket 6 on the truck frame 2. The pivotal connection at 74 between the straps 68 and 70 and the lower end of the dead lever 76 is made adjustable as by means of the manual slack adjuster 78. Between the two halves of the dead lever 76 and at a point intermediate its ends is pivotally hung as at 80 the brake head 82 on which is supported the brake shoe 84 adjacent the periphery of the associated wheel.

Between the wheels the brake heads 86 and 88 are pivotally supported as at 90 and 92 from points intermediate the links of the respective live levers 40 and 64. The brake shoes 94 and 96 mounted respectively on the brake heads 86 and 88 have face engagement with the peripheries of the respectively associated wheels.

The brake hangers 14 and 16 already referred to as providing supporting means for the brake rigging intermediate the wheels are pivotally supported at their upper ends as at 98 and 100 from the respective brackets 10 and 12. The lower ends of the hangers 14 and 16 may be pivotally connected as at 90 and 92 to the respective live levers 40 and 64.

Operative means for actuation of the brake rigging may consist of the brake cylinder 102 mounted on the truck frame 2 by means of the bracket 103. The piston of the cylinder 102 is pivotally connected as at 106 by means of the push rod 104 to an intermediate point of the live cylinder lever 56. Mounted on the opposite end of the cylinder 102 is the automatic slack adjuster 108. The dead cylinder lever 48 is pivotally connected at a point intermediate its ends as at 110 to the slack adjuster 108.

Operation of the power means, shown as the cylinder 102, will move the push rod 104 to the right as viewed in Figure 2 thus causing the live cylinder lever 56 to pivot in a counterclockwise direction about the point 54 thus moving to the right the link 60 and the upper end of the live lever 64 to which the link 60 is connected. The live lever 64, thus actuated, rotates in a clockwise direction about the pivot point 66 thus moving the brake head 88 to the right and bringing the brake shoe 96 into engagement with the periphery of the associated wheel. Continued movement of the push rod 104 will cause the live lever 64 to pivot about the point 92 thus moving the straps 68 and 70 to the left and causing rotation of the dead lever 76 in a clockwise direction about the pivot point 77 thus moving the brake head 82 to the left and bringing into bearing against the periphery of the associated wheel the brake shoes 84.

It will be understood, of course, that the operative movements just described and those about to be described take place almost instantaneously and practically simultaneously.

Continued actuation of the power means will cause the push rod 104 to move still further to the right thus rotating the live cylinder lever 56 in a clockwise direction about the pivot point 58 thus moving to the right the pull rod 52 and causing rotation of the dead cylinder lever 48 in a clockwise direction about the pivot point 110. The said rotation of the dead cylinder lever 48 through the link connection 44 thus moves to the left the upper end of the live lever 40 thus rotating the said live lever 40 in a counter-clockwise direction about the pivot point 38 and bringing into engagement with the periphery of the associated wheel the brake shoe 94 mounted on the brake head 86 and, in turn, carried by the live lever 40. Further rotation of the dead cylinder lever 48 causes the live lever 40 to pivot in a counter-clockwise direction about the pivot point 90, thus causing the straps 32 and 34 to be moved to the right and rotating the dead lever 15 in a counter-clockwise direction about the pivot point 22. The said rotation of the dead lever 15 brings into bearing against the periphery of the associated wheel the brake shoe 28 mounted on the brake head 24 which is carried by the dead lever 15.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In clasp brake rigging for four wheel railway car trucks, the combination of a truck frame, dead truck levers pivotally supported from said truck frame outwardly of the wheels thereof, live truck levers supported intermediate the wheels, straps connecting the lower ends of the live and dead truck levers for each wheel, a brake head pivotally mounted on each of said live and dead truck levers intermediate the ends thereof, hangers carried on said truck frame intermediate the wheels and having their lower ends operatively connected to said live truck levers at the said pivotal points where said brake heads are carried, links connecting the upper ends of said live truck levers to vertically disposed live and dead cylinder levers, a cylinder mounted on said truck intermediate the wheels thereof and having a piston operatively connected to said live cylinder lever, a slack adjuster mounted on said cylinder at the end opposite said piston, and a pivotal connection between said slack adjuster and said dead cylinder lever.

2. A clasp brake rigging for four wheel railway car trucks comprising live and dead levers mounted on opposite sides of each car wheel, a connection between the live and dead levers for each wheel, brake hangers pivotally supporting said levers intermediate the wheels, vertically arranged live and dead cylinder levers having their lower ends operatively connected to said truck levers intermediate the wheels and having their upper ends connected by a pull rod, and power means connected between said cylinder levers and having one end operatively connected to one of said cylinder levers for operation of said brake rigging and the other end operatively connected to the other of said cylinder levers for slack adjustment.

3. In a clasp brake rigging for four wheel railway car trucks, the combination of a truck frame, live and dead truck levers mounted on opposite sides of each wheel and operatively connected to each other, vertically arranged live and dead cylinder levers operatively connected to the live truck levers associated with a pair of car wheels and having their upper ends connected by a pull rod, and power means mounted between said cylinder levers and having a connection to one of said levers for operation of said brake rigging and a connection to the other of said levers for slack adjustment.

4. In a four wheel railway car truck, a truck frame, clasp brake rigging comprising dead truck levers supported from said frame outwardly of the wheels, live truck levers supported from said truck frame inwardly of the wheels, straps connecting the lower ends of the live and dead truck levers for each wheel, hangers pivotally supported from said truck frame and operatively connected to said live truck levers between said wheels at points intermediate the ends of said live truck levers, the upper ends of said live truck levers being operatively connected respectively to vertically arranged live and dead cylinder levers, a pull rod connecting the upper ends of said live and dead cylinder levers, and a cylinder mounted on said truck frame and having one end pivotally and adjustably connected to said dead cylinder lever and a piston rod at its opposite end operatively connected to said live cylinder lever at a point intermediate its ends.

5. In clasp brake rigging for four wheel railway car trucks, the combination of a truck frame, dead truck levers pivotally supported from said truck frame outwardly of the wheels thereof, live truck levers supported intermediate the wheels, straps connecting the lower ends of the live and dead truck levers for each wheel, a brake head pivotally mounted on each of said live and dead truck levers intermediate the ends thereof, hangers carried on said truck frame intermediate the wheels and having their lower ends operatively connected to said live truck levers at the said pivotal points where said brake heads are carried, links connecting the upper ends of said live truck levers to vertically disposed live and dead cylinder levers, a cylinder mounted on said truck frame and having a piston operatively connected to said live cylinder lever for operation of said brake rigging, and a pivotal and adjustable connection between said dead cylinder lever and the end of said cylinder opposite said piston.

6. In a clasp brake rigging for four wheel railway trucks, live and dead truck levers mounted on opposite sides of each wheel, straps connecting the truck levers for each wheel, hangers supporting said truck levers intermediate the wheels, vertically arranged live and dead cylinder levers having their lower ends operatively connected to the upper ends of said truck levers intermediate the wheels and having their upper ends operatively connected to each other, a brake cylinder mounted intermediate said cylinder levers and having a piston connected to said live cylinder lever, and an automatic slack adjuster mounted on said cylinder opposite its piston end and connected to said dead cylinder lever.

7. In a clasp brake rigging for a four wheel railway car truck, the combination of a truck frame, dead truck levers supported on said truck frame outwardly of the wheels, live truck levers supported from said truck frame intermediate the wheels, straps pivotally and adjustably connecting the lower ends of the live and dead truck levers for each car wheel, a brake head mounted on each of said live and dead truck levers, hangers supported from said frame and pivotally connected to each of said live truck levers at points intermediate its ends, links connecting the upper ends of said live truck levers to the lower ends of vertically disposed live and dead cylinder levers, a pull rod connecting the upper ends of said live and dead cylinder levers, a cylinder mounted on said truck frame, a slack adjuster mounted on one end of said cylinder, and a piston rod extending from the opposite end of said cylinder and pivotally connected to a point intermediate the ends of said live cylinder lever for operation of said brake rigging.

8. In a four wheel railway car truck the combination of a truck frame, clasp brake rigging supported on said truck frame by dead truck levers outwardly of said wheels and hangers intermediate said wheels and comprising a live and dead truck lever for each wheel, straps connecting the lower ends of said live and dead truck levers, a brake head mounted on each of said live and dead truck levers intermediate the ends thereof, links connecting the upper ends of said live truck levers to live and dead vertically disposed cylinder levers, a pull rod connecting the upper ends of said cylinder levers, and a brake cylinder mounted on said truck frame and having a piston operatively connected to a point intermediate the ends of said live cylinder lever.

9. In a clasp brake rigging for four wheel railway car trucks, the combination of a truck frame, dead truck levers supported on said truck frame outwardly of the wheels, live truck levers supported from said truck frame intermediate the wheels, straps pivotally and adjustably connecting the lower ends of the live and dead truck levers for each car wheel, a brake head mounted on each of said live and dead truck levers, hangers supported from said frame and pivotally connected to each of said live truck levers at points intermediate their ends, links connecting the upper ends of said live truck levers to the lower ends of vertically disposed live and dead cylinder levers, a pull rod connecting the upper ends of said live and dead cylinder levers, and a cylinder mounted on said truck frame, said dead cylinder lever being supported by said cylinder and said live cylinder lever having a connection at a point intermediate its ends with the piston of said cylinder.

10. In a clasp brake rigging for a four wheel railway car truck, the combination of a truck frame, dead truck levers supported on said truck frame outwardly of the wheels, live truck levers supported from said truck frame intermediate the wheels, straps pivotally and adjustably connecting the lower ends of the live and dead truck levers for each car wheel, a brake head mounted on each of said live and dead truck levers, hangers supported from said frame and pivotally connected to each of said live truck levers at points intermediate the ends, links connecting the upper ends of said live truck levers to the lower ends of vertically disposed live and dead cylinder levers, a pull rod connecting the upper ends of said live and dead cylinder levers, a cylinder mounted on said truck frame, a slack adjuster mounted on one end of said cylinder, and a piston rod extending from the opposite end of said cylinder, said slack adjuster and said rod being pivotally connected to the dead and live cylinder levers respectively.

11. In a four wheel railway car truck the combination of a truck frame, clasp brake rigging supported on said truck frame by dead truck levers outwardly of said wheels and hangers intermediate said wheels and comprising a live and dead truck lever for each wheel, straps connecting the lower ends of said live and dead truck levers, a brake head mounted on each of said live and dead truck levers intermediate the ends thereof, links connecting the upper ends of said live truck levers to live and dead vertically disposed cylinder levers, a pull rod connecting the upper ends of said cylinder levers, a brake cylinder mounted on said truck frame and having a piston operatively connected to a point intermediate the ends of said live cylinder lever, and a slack adjuster mounted on said cylinder opposite said piston and having a pivotal connection with a point intermediate the ends of said dead cylinder lever.

12. In a clasp brake mechanism for four wheel railway car trucks the combination of dead truck levers supported outwardly of each car wheel, live truck levers supported inwardly of each car wheel, brake heads pivotally supported on all of said truck levers, straps connecting the lower ends of said live and dead levers for each wheel, links connecting the upper ends of said live truck levers to the lower ends of vertically disposed live and dead cylinder levers, a pull rod connecting the upper ends of said cylinder levers, and a cylinder, the piston of which is operatively connected to an intermediate point of the live cylinder lever for operation of said brake mechanism.

13. In a clasp brake rigging for a four wheel railway car truck, the combination of a truck frame, dead truck levers supported on said truck frame outwardly of the wheels, live truck levers supported from said truck frame intermediate the wheels, straps pivotally and adjustably connecting the lower ends of the live and dead truck levers for each car wheel, a brake head mounted on each of said live and dead truck levers, hangers supported from said frame and pivotally connected to each of said live truck levers at points intermediate its ends, links connecting the upper ends of said live truck levers to the lower ends of vertically disposed live and dead cylinder levers, a pull rod connecting the upper ends of said live and dead cylinder levers, a cylinder mounted on said truck frame and having a piston operatively connected to a point intermediate the ends of said live cylinder lever, and a pivotal and adjustable connection at a point intermediate its ends between said dead cylinder lever and the end of said cylinder opposite said piston.

14. In a clasp brake rigging for four wheel railway car trucks the combination of dead truck levers supported outwardly of the car wheels, live truck levers supported intermediate the car wheels, straps connecting the lower ends of said levers for each wheel, a brake head pivotally secured on each of said truck levers at a point intermediate its ends, links connecting the upper end of said live truck levers to the lower ends of vertically disposed live and dead cylinder levers, a pull rod connecting the upper ends of said cylinder levers, a cylinder, the piston of which is operatively connected to a point intermediate the ends of said cylinder lever, and an automatic slack adjuster mounted on said cylinder opposite its piston and pivotally connected to a point intermediate the ends of said dead cylinder lever.

15. In a clasp brake rigging for a four wheel railway car truck, the combination of dead truck levers supported outwardly of the car wheels, live truck levers supported intermediate the car wheels, straps connecting the lower ends of the live and dead truck levers for each car wheel, a brake head pivotally supported intermediate the ends of each of said live and dead truck levers, links connecting the upper ends of said live truck levers to vertically disposed live and dead cylinder levers, a pull rod connecting the upper ends of said cylinder levers, a brake cylinder having a piston operatively connected to a point intermediate the ends of the live cylinder lever, and hangers carried on said truck and supporting said brake rigging intermediate said wheels.

16. In a clasp brake mechanism comprising brake levers connected to brake shoes applied to opposite sides of each car wheel, tie straps connecting the lower ends of said brake levers, links connecting the upper ends of one brake lever for each wheel to the lower ends of vertically disposed cylinder levers, a pull rod connecting the upper ends of said cylinder levers, a cylinder having its piston operatively connected to an intermediate point of one of said cylinder levers for transmitting braking movements, and a pivotal connection between an intermediate point of the other of said cylinder levers and a slack adjuster, said slack adjuster being secured on said cylinder.

17. In brake rigging for a four wheel railway car truck, the combination of a truck frame, dead truck levers supported on said truck frame outwardly of the wheels, live truck levers supported intermediate the wheels, straps connecting the said levers for each wheel, vertically arranged live and dead cylinder levers having their lower ends operatively connected to said live truck levers and their upper ends connected by a pull rod, and power means mounted on said truck frame and operatively connected to said live and dead cylinder levers.

18. In a clasp brake mechanism comprising brake levers connected to brake shoes applied to opposite sides of each car wheel, straps connecting the lower ends of said levers, vertically disposed cylinder levers having their lower ends connected to one of said brake levers for each car wheel, a pull rod connecting the upper ends of said cylinder levers, and a brake cylinder having a piston operatively connected to an intermediate point of one of said cylinder levers.

19. In a clasp brake rigging for four wheel railway trucks, the combination of live and dead truck levers mounted on opposite sides of each car wheel, straps connecting said levers for each car wheel, hangers supporting said live truck levers intermediate the wheels, vertically arranged cylinder levers having their lower ends operatively connected to said live truck levers and their upper ends operatively connected to each other, and power means connected between said cylinder levers for operation of said brake rigging.

20. A clasp brake rigging for four wheel railway car trucks comprising live and dead truck levers supported at opposite sides of each car wheel, straps connecting said levers for each wheel, a brake head pivotally mounted on each of said levers, hangers pivotally supporting said truck levers intermediate the wheels, said last mentioned levers having their upper ends operatively connected respectively to vertically arranged live and dead cylinder levers, a pull rod connecting the opposite ends of said cylinder levers, and power means connected between said live and dead cylinder levers for operation of said brake rigging.

21. In a railway brake rigging the combination of braking elements disposed for cooperation at opposite sides of each wheel, live and dead truck levers associated with the respective braking elements for each wheel, power means and slack adjusting means, vertically arranged equalizing levers having their mid-points connected respectively to said power means and to said slack adjusting means, and having their upper ends operatively connected to each other, and operative connections between the lower ends of said equalizing levers and said live truck levers respectively.

22. In a four wheel railway car truck the combination of a truck frame, a brake cylinder secured to each side of said truck frame at or near the center line thereof, slack adjusting means mounted on said cylinder, vertically arranged equalizing levers having their mid-points operatively connected respectively to said cylinder and to said slack adjusting means and having their upper ends operatively connected to each other, braking means disposed for engagement with the opposite sides of each wheel, and operative connections between said equalizing levers and said braking means respectively.

23. In a four wheel railway car truck a truck frame, power means mounted on said frame and carrying slack adjusting means, vertically arranged equalizing levers having points intermediate their ends connected respectively to said power means and to said slack adjusting means and having their upper ends operatively connected to each other, braking means disposed for cooperation with the opposite sides of each wheel, and operative connections between the lower ends of said equalizing levers respectively and said braking means.

24. In a railway car truck, brake rigging comprising power means and slack adjuster means mounted on said truck, braking means disposed for braking engagement with the opposite sides of each wheel and comprising live and dead truck levers operatively connected to each other for each wheel, vertically disposed equalizing levers connected intermediate their ends respectively to said power means and to said slack adjuster means and connected at their upper ends to each other, and operative connections respectively between said live truck levers and the lower ends of said equalizing levers.

25. In brake rigging for a four wheel railway car truck, power means and slack adjuster means mounted on said truck, braking means disposed for operative engagement with the opposite sides of each car wheel, vertically disposed equalizing levers connected respectively at points intermediate their ends to said power means and to said slack adjuster means and connected at their upper ends to each other, and operative connections between said equalizing levers and said braking means respectively.

26. In a four wheel railway truck a brake arrangement comprising power means and slack adjusting means mounted on said truck, braking means disposed for cooperation with the opposite sides of car wheels at opposite ends of said truck, and vertically arranged equalizing levers having their upper ends operatively connected to each other, points intermediate their ends operatively connected respectively to said power means and to said slack adjusting means and having their lower ends connected respectively to said braking means.

WALTER H. BASELT.